(12) United States Patent
Shivashankar et al.

(10) Patent No.: US 12,373,771 B1
(45) Date of Patent: Jul. 29, 2025

(54) DEADLINE-AWARE MULTI-AGENT TOUR PLANNING

(71) Applicant: Amazon Technologies, Inc., Seattle, WA (US)

(72) Inventors: Vikas Shivashankar, Andover, MA (US); Michael Andrew Caldara, Medford, MA (US); Joseph Durham, Arlington, MA (US); Taoan Huang, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 769 days.

(21) Appl. No.: 17/708,354

(22) Filed: Mar. 30, 2022

(51) Int. Cl.
| | |
|---|---|
| *G06Q 10/087* | (2023.01) |
| *B65G 1/04* | (2006.01) |
| *G05D 1/00* | (2024.01) |
| *G06N 5/01* | (2023.01) |

(52) U.S. Cl.
CPC ......... *G06Q 10/087* (2013.01); *B65G 1/0492* (2013.01); *G05D 1/0297* (2013.01); *G06N 5/01* (2023.01)

(58) Field of Classification Search
CPC .. G06Q 10/087; B65G 1/0492; G05D 1/0297; G06N 5/01
See application file for complete search history.

(56) References Cited

U.S. PATENT DOCUMENTS

| | | |
|---|---|---|
| 8,280,547 B2 | 10/2012 | D'Andrea et al. |
| 9,087,314 B2 | 7/2015 | Hoffman et al. |
| 9,555,978 B1 * | 1/2017 | Hanssen ............... B65G 1/1378 |
| 10,538,190 B1 * | 1/2020 | Metellus ................... B60F 5/02 |
| 2014/0135977 A1 * | 5/2014 | Wurman ............... B65G 1/1378 700/218 |
| 2017/0166399 A1 * | 6/2017 | Stubbs ................. G06Q 10/087 |
| 2021/0047121 A1 * | 2/2021 | Stevens .................. B65G 1/065 |
| 2022/0187847 A1 * | 6/2022 | Cella ...................... G06Q 10/06 |

FOREIGN PATENT DOCUMENTS

| | | | | |
|---|---|---|---|---|
| CA | 2514523 C | * | 5/2011 | ........... G05D 1/0274 |
| CA | 2927096 C | * | 2/2023 | ............... B64D 1/12 |
| EP | 3433690 B1 | * | 12/2020 | ............ B25J 9/1666 |

* cited by examiner

*Primary Examiner* — Jacob S. Scott
*Assistant Examiner* — Erin Morris
(74) *Attorney, Agent, or Firm* — Kilpatrick Townsend & Stockton LLP

(57) ABSTRACT

Embodiments are described for implementing a tour generation feature for completing tasks within a facility of an inventory management system. Coordinates for stations, starting locations of inventory holders, and rest locations of the inventory holders of the facility may be obtained. A set of tasks may be determined for each station based on an inventory item requirement associated with each station. A priority order for a subset of inventory holders may be determined based on priority characteristics associated with each inventory holder. Tours for the subset of inventory holders may be determined based on the set of tasks, the coordinates, and travel attributes for each inventory holder. The tours may be modified by iteratively invoking a large neighborhood search algorithm that uses destroy heuristics. Previously determined tours for other subsets of inventory holders may be updated using the modified tours for the subset of inventory holders.

20 Claims, 9 Drawing Sheets

DEADLINE-AWARE MULTI-AGENT TOUR PLANNING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
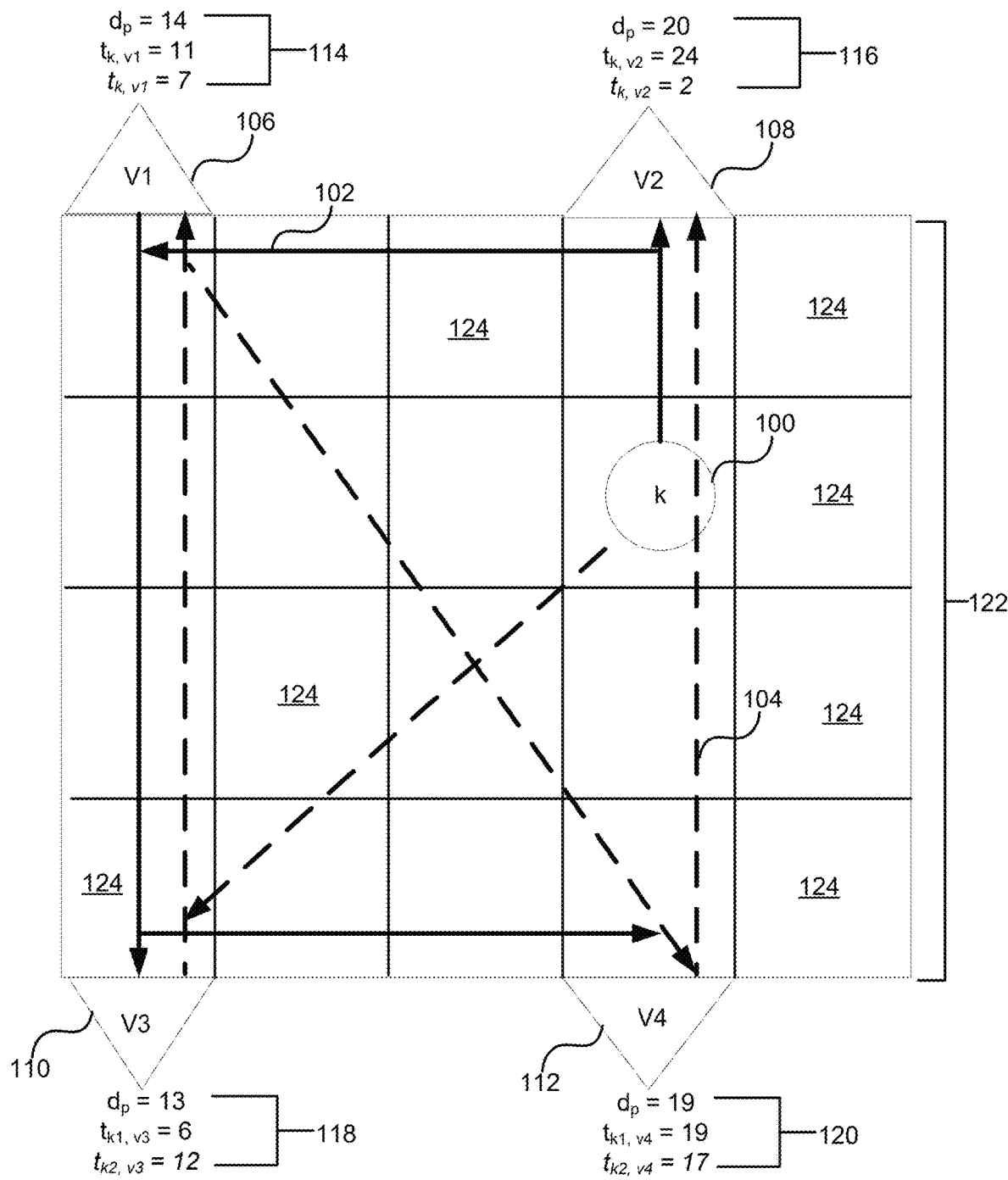
FIG. 1 depicts a conventional tour implementation for an agent traversing a facility to visit a number of stations of the facility.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a facility (inventory management system) having multiple container holders, stations, and autonomous mobile robots for performing tasks associated with inventory stored within the facility. Specifically, features herein are directed to a tour generation feature for generating tours and routes which specify stations for inventory holders to visit in a particular order and perform tasks at the stations for transferring inventory within the facility. The inventory holders may include one or more containers configured to hold items (inventory items) within the facility. In embodiments, autonomous mobile robots are provided to move inventory, via the inventory holders, among one or more stations of a facility (e.g., a warehouse or workspace) by a certain time period (time constraint) to complete assigned tasks. In accordance with at least one embodiment, the inventory holders are configured to move inventory among the one or more stations of a facility by the certain time period to complete assigned tasks absent the autonomous mobile robot. The inventory holders may operate within one or more areas of the facility and hold inventory items (within the containers) going to or coming from other areas of the facility or outside the facility. The inventory holders may be placed next to other inventory holders to form one or more rows of dense storage.

Service provider computers implementing the tour generation features described herein may obtain information about the facility, stations, and inventory holders to determine tasks which involve transferring the inventory items from the inventory holders to the stations, tours which indicate which particular inventory holder should visit which particular stations to complete a set of tasks (tasks) including an order of the stations to visit, and routes which include specific instructions for navigating the facility and between visits to stations to complete tasks (e.g., coordinates, speed, direction, etc.). In embodiments, the tour generation feature described herein generates the tours for a plurality of inventory holders taking into account delays introduced by the potential visiting of a certain station by more than one inventory holder to complete a task. For example, the service provider computers may determine that two given inventory holders need to visit a certain station to complete a task based on the inventory items currently stored in the two given inventory holders. However, to maximize resource usage and reduce queuing delays at the certain station, the service provider computers may determine a tour for one of the inventory holders to visit another nearby station and then visit the certain station to avoid delays from sending two inventory holders to the same station at the same time to perform a task. Conventional tour generation methods may utilize simple path routing which can cause a large delay from agents visiting the same station.

A facility may generally operate at full capacity meaning that the location and configuration of the inventory holders, stations, and autonomous mobile robots described herein enable efficient use of the space within the facility and increase the efficiency of fulfilling inventory transfer orders or inventory processing. The tour generation feature described herein includes embodiments where stations can be implemented in multiple configurations which may include dedicated areas (such as the areas where inventory is processed) for inventory processing as well as dynamically placed stations and configurations of inventory holders. For example, the inventory holders may be configured to utilize associated propulsion components to move from a starting location or area of the facility to a number of stations to complete tasks and then navigate to a rest location or area for recharging or while awaiting the assignment of another tour and route to complete another set of tasks.

In a non-limiting example, service provider computers that include an inventory management module for implementing the tour generation features, described herein, may determine a set of tasks based on inventory item requirements by the stations of a facility. For example, each station may be associated with fulfilling a number of inventory purchase orders or inventory transfer orders which require certain inventory items to be stored (stowed) or transferred to the station by an inventory holders. The facility may include several areas where one or more inventory holders store various items of inventory. In embodiments, the service provider computers may identify inventory holders within the facility that can be utilized to execute and complete the determined set of tasks. In embodiments, each task may identify a number of stations that must be visited and have inventory transferred to it by an inventory holder within a certain time period (time constraint). In embodiments, the time constraint may be specific to a station, to a station and inventory holder combination, shared between a number of stations, or shared between a number of stations and inventory holders. The time constraint may also include a global time constraint by which all tasks must be completed by for the stations of a facility. The service provider computers may determine a priority order for the inventory holders based on priority characteristics associated with the inventory holders (e.g., determine a tour for the inventory holder which has to visit the most stations based on the inventory items stored in said inventory holder first before determining a tour for the inventory holder with the second most inventory items stored within, and so on). In embodiments, the service provider computers may determine a tour for each inventory holder based on the set of tasks, coordinates for the stations, inventory holders, and start locations of the inventory holders, and travel attributes for each inventory holder.

In accordance with at least one embodiment, the tour generation feature determines the tours for the inventory holders simultaneously so as to take into consideration delays introduced not only by each inventory holder navigating the facility to visit the set of stations to complete a task, or the delay in transferring inventory from the inventory holder to a station, but also the potential delays introduced by requiring more than one inventory holder to visit a given station at a given time (queuing delay). As used herein, a "tour" for an inventory holder includes a specific order of stations that need to be visited by a particular inventory holder within a certain time period (e.g., station A by time period X, station B by time period Y, and so on). As used herein, a "route" includes specific navigation instructions for the inventory holder (or autonomous mobile robot moving the inventory holder) to different areas of a facility to complete the tour and task assigned to the inventory holder. The navigation instructions can include instructions for activating and modulating an associated propulsion component of the inventory holder, steering directions, object avoidance instructions, and coordinates to visit to complete the tours and tasks within the certain time period. In accordance with at least one embodiment, the service provider computers may optimize a solution (e.g., modify the determined tours for the inventory holders) given the parameters of the tasks, coordinates, and time period by implementing, iteratively, a large neighborhood search algorithm that uses destroy heuristics (e.g., remove a set of inventory holders from a given solution and recalculate the tours for the remaining set of inventory holders). This iterative process can be performed a number of times until an optimal solution is found. Each iteration may utilize a different destroy heuristic and/or a different priority characteristic. The service provider computers can add the modified tours to an overall tour plan for all inventory holders of a facility that were previously determined and will be executed at the same time. The service provider computers may generate and transmit routes to the inventory holders according their assigned tour and task to move the inventory holders to each station in an order dictated by the tour to complete the tasks within the time period.

In accordance with at least one embodiment, the service provider computers implementing the route generation features described herein may maintain information identifying the location (e.g., coordinates) of a plurality of inventory holders, stations, and autonomous mobile robots within the facility. In embodiments, the information may also include coordinates for a starting location and rest location (start coordinates and rest coordinates) for the plurality of inventory holders, stations, and autonomous mobile robots within the facility. The service provider computers may obtain updated coordinates for these components of the facility as they execute assigned tasks and tours within the facility or upon completion of the tasks and tours. Updated tours, tasks, and routes may be generated by the service provider computers upon receiving feedback (information, updated information, new information) from the inventory holders, stations, or autonomous mobile robots. For example, a particular inventory holder may have an equipment malfunction which causes it to no longer be able to move while executing an assigned task and tour, or a station may have an equipment malfunction which causes it to no longer be able to receive inventory items. The service provider computers may updated previously determined tours and tasks for the plurality of inventory holders based on this updated information or feedback from the components of the facility.

FIG. 1 depicts a conventional tour implementation for an agent traversing a facility to visit a number of stations of the facility. FIG. 1 depicts agent k 100, which may represent an inventory holder of a facility, utilizing two different determined tours 102 and 104 (102 is represented by the solid line whereas 104 is represented by the dashed line). The tours 102 and 104 involve the agent k 100 visiting each station, stations V1-V4 (106-112, respectively) by a certain time period to complete a task. FIG. 1 also depicts the time data 114-120 for each station which depicts the time by which agent k 100 needs to visit the associated station (represented as $d_p$), the time by which agent k 100 reaches the associated station using tour 102 (represented by $t_k$), and the time by which agent k 100 reaches the associated station using tour 104 (represented by $t_k$). FIG. 1 also depicts an area 122 of a facility that is represented in FIG. 1 as a number of grids 124. In embodiments, each grid 124 may be associated with a cost, in time, for traversing said grid by agent k 100.

FIG. 1 depicts an optimal tour 102 as well as a non-optimal tour 104 generated for agent k 100 for visiting each station 106-112 by a certain time period using conventional tour generation features. For example, as illustrated in FIG. 1, optimal tour 102 has agent k 100 traversing the grids 124 of area 122 to visit each station 106-112 using a certain order so as to not exceed the certain time period required by each station 106-112. FIG. 1 also depicts non-optimal tour 104 has agent k 100 traversing the grids 124 of area 122 to visit stations 106-112 in a different order that results in the visit to station V2 (108) violating its time constraint (represented as $d_p=20$ and $t_k=24$). FIG. 1 depicts optimal tour 102 having agent k 100 vising station V2 (108) first, station V1 (106) second, station V3 (110) third, and station V4 (112) last. FIG. 1 depicts non-optimal tour 104 having agent K 100 visiting station V3 (110) first, station V1 (106) second, station V4 (112) third, and station V2 (108) last. Conventional route generation methods are able to determine a solution (optimal tour 102) for agent k 100 visiting the set of stations 106-112 without violating each stations time constraints (114-120).

However, the scenario represented in FIG. 1 is a simple scenario that only involves one agent (agent k 100) and four stations (106-112). Real world facilities are large (thousands of feet), utilize multiple agents (inventory holders) and stations in the hundreds, to process hundreds of thousands of inventory item transfers (e.g., tours to visit said stations and perform a task). Further complicating the problems facing real world configurations of facilities, stations, and inventory holders, that the tour generation features described herein solve, is that the solutions depicted in FIG. 1 fail to take into account any delays instead just looking for the fastest path for agent k 100 to visit each station. However, in real world scenarios delays occur from each inventory holder and autonomous mobile robot traversing the facility (travel time delays), having potentially varying drive physics (travel attributes or drive physics which detail the speed at which the inventory holders and/or autonomous mobile robots can traverse the facility given the capabilities of the propulsion components and load being moved), delays introduced by the picking or stowing tasks at each station (delay from moving an inventory item of an inventory holder to or from a station), as well as queuing delays from multiple inventory holders visiting a same station at a given time to complete a task. The solutions to these problems, which can be generated by the tour generation features described herein, are described in further detail and illustrated in FIGS. 3 and 4 below.

Figure 2:
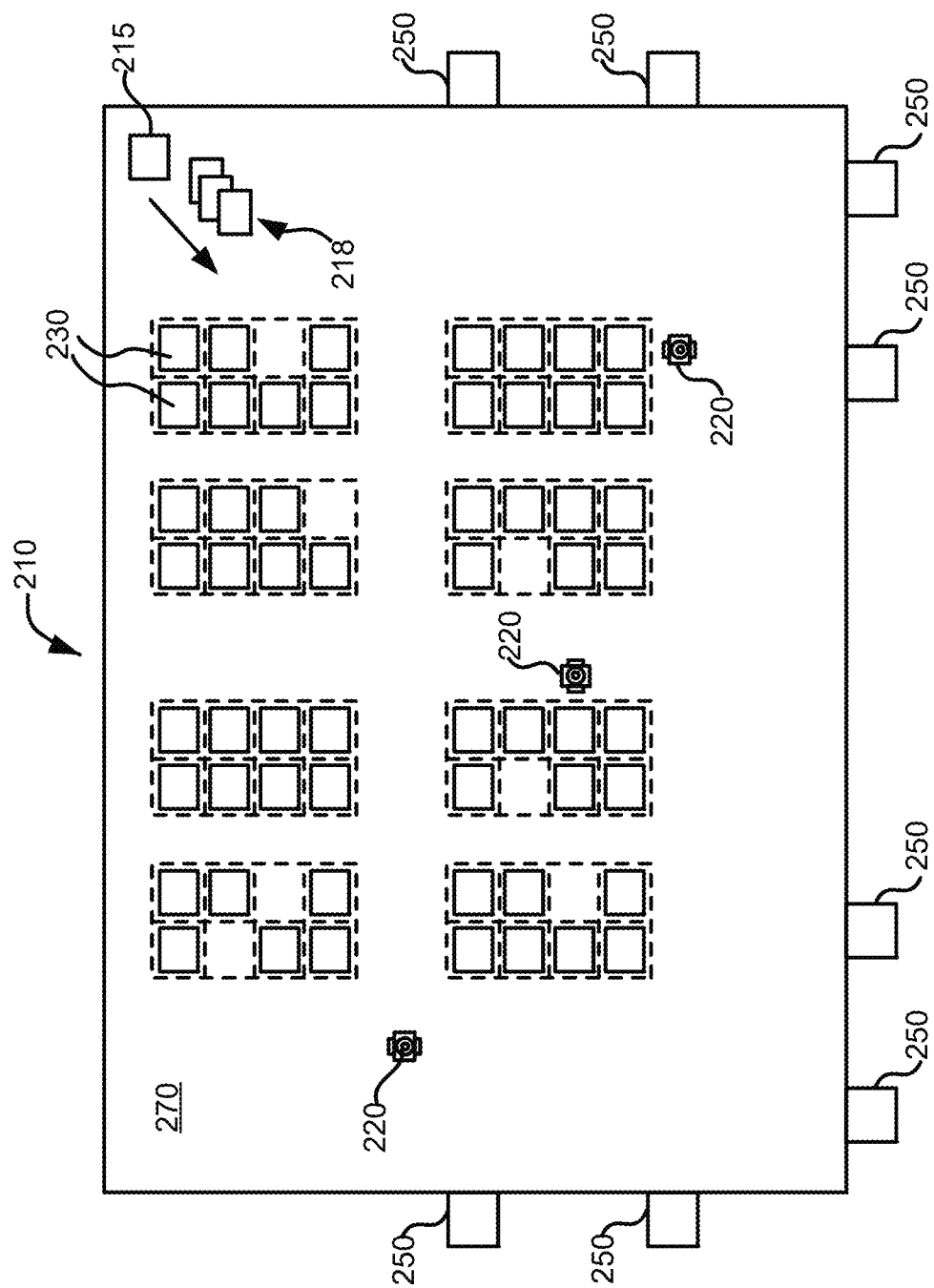
FIG. 2 depicts components of a facility (inventory management system), in accordance with at least one embodiment.

FIG. 2 depicts components of a facility (inventory management system), in accordance with at least one embodiment. FIG. 2 illustrates the components of facility 210. Facility 210 includes an inventory management module 215, one or more autonomous mobile robots 220, one or more inventory holders 230, and stations 250. In FIG. 2, autonomous mobile robots 220 transport inventory holders 230 between points within a workspace 270 of facility 210 in response to commands communicated by inventory management module 215. In some embodiments, the inventory holders 230 transport themselves, using associated propulsion components, between points within the workspace 270 of facility 210 in response to command or instructions communicated by inventory management module 215. In embodiments, inventory management module 215 may be implemented by one or more service provider computers as described herein and illustrated in FIG. 8 below. Each inventory holder 230 stores one or more types of inventory items. As a result, facility 210 is capable of moving inventory items between locations within workspace 270 to facilitate the entry, processing, and/or removal of inventory items from facility 210 and the completion of other tasks involving inventory items.

Inventory management module 215 assigns tasks to appropriate components of facility 210 (e.g., autonomous mobile robots 220 and/or inventory holders 230) and coordinates operation of the various components in completing the tasks. These tasks may relate not only to the movement and processing of inventory items, but also to the management and maintenance of the components of facility 210. Although shown in FIG. 2 as a single, discrete component, inventory management module 215 may represent multiple components and may represent or include portions autonomous mobile robots 220, inventory holders 230, or other elements of facility 210. As a result, any or all of the interactions between a particular autonomous mobile robot 220, inventory holder 230, and inventory management module 215 that are described herein may, in particular embodiments, represent peer-to-peer communication between that autonomous mobile robot 220 and one or more other autonomous mobile robots 220 and inventory holders 230.

Autonomous mobile robot 220 may move inventory holders 230 between locations within workspace 270. In embodiments, inventory holders 230 may move between locations within workspace 270 absent the autonomous mobile robot 220 using similar propulsion components and instructions as the autonomous mobile robot 220. Autonomous mobile robot 220 may represent any devices or components appropriate for use in facility 210 based on the characteristics and configuration of inventory holders 230 and/or other elements of facility 210. In a particular embodiment of facility 210, autonomous mobile robot 220 represents independent, self-powered devices configured to freely move about workspace 270. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, autonomous mobile robots 220 represent elements of a tracked inventory system configured to move inventory holder 230 along tracks, rails, cables, crane system, or other guidance or support elements traversing workspace 270. In such an embodiment, autonomous mobile robots 220 may receive power and/or support through a connection to the guidance elements, such as a powered rail. Additionally, in particular embodiments of facility 210 autonomous mobile robots 220 may be configured to utilize alternative conveyance equipment to move within workspace 270 and/or between separate portions of workspace 270. In accordance with at least one embodiment, inventory holders 230 are configured to perform navigation and traversal throughout the workspace 270 in a similar fashion as that described above for the autonomous mobile robots 220 without the aid of the autonomous mobile robots 220 (e.g., using its own propulsion mechanism or other suitable components).

Autonomous mobile robots 220 and/or inventory holders 230 may communicate with inventory management module 215 wirelessly, using wired connections between autonomous mobile robots 220 and/or inventory holders 230, and inventory management module 215, and/or in any other appropriate manner. As one example, in a tracked facility 210, tracks or other guidance elements upon which autonomous mobile robots 220 and/or inventory holders 230 move may be wired to facilitate communication between components of facility 210. In general, autonomous mobile robots 220 and/or inventory holders 230 may be powered, propelled, and controlled in any manner appropriate based on the configuration and characteristics of facility 210.

Inventory holders 230 store inventory items. In a particular embodiment, inventory holders 230 include multiple storage bins (containers) with each storage bin capable of holding one or more types of inventory items. Additionally, in particular embodiments, inventory items may also hang from hooks or bars (not shown) within or on inventory holder 230. In general, inventory holder 230 may store inventory items in any appropriate manner within inventory holder 230 and/or on the external surface of inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, containers located at a corner of two faces may be accessible through either of those two faces, while each of the other containers is accessible through an opening in one of the four faces. Autonomous mobile robots 220 may be configured to rotate inventory holder 230 at appropriate times to present a particular face and the containers associated with that face to an operator, other autonomous mobile robots 220, other inventory holders 230, or other components of facility 210. In some embodiments, the inventory holders 230 may be configured to rotate themselves at appropriate times to present a particular face and the containers associated with that face to an operator, other autonomous mobile robots 220, other inventory holders 230, or other components of facility 210.

Inventory items represent any objects suitable for storage, retrieval, and/or processing in facility 210. For the purposes of this description, "inventory items" may represent any one or more objects of a particular type that are stored in facility 210. Thus, a particular inventory holder 230 is currently "storing" a particular inventory item if the inventory holder 230 currently holds one or more units of that type. As one example, facility 210 may represent a mail order warehouse facility, and inventory items may represent merchandise stored in the warehouse facility. During operation, autonomous mobile robots 220 may retrieve inventory holders 230 containing one or more inventory items requested in an order to be packed for delivery to a customer or inventory holders 230 carrying pallets containing aggregated collections of inventory items for shipment by touring a set of stations 250 of facility 210. Moreover, in particular embodiments of facility 210, boxes containing completed orders may themselves represent inventory items.

In particular embodiments, facility 210 may also include one or more stations 250. Stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g. from pallet- or case-sized groups to individual inventory items), the consolidation of inventory items between inventory holders 230, and/or the processing or handling of inventory items in any other suitable manner. In particular embodiments, stations 250 may just represent the physical locations where a particular task involving inventory items can be completed within workspace 270. Stations 250 can move to other locations within the workspace 270 based on instructions from the inventory management module 215 or may be uninstantiated or be removed from within workspace 270. Stations 250 may represent both the physical location and also any appropriate equipment for processing or handling inventory items, such as scanners for monitoring the flow of inventory items in and out of facility 210, communication interfaces for communicating with inventory management module 215, and/or any other suitable components. Stations 250 may be controlled, in part, by human operators or may be fully automated. Moreover, the human or automated operators of stations 250 may be capable of performing certain tasks to inventory items, such as packing, counting, or transferring inventory items, as part of the operation of facility 210. In particular embodiments, facility 210 may include one or more stations 250 that are located at different coordinates throughout the workspace 270 and facility 210. Stations 250 may represent fixed or immobile locations designated for the completion of particular tasks involving inventory items.

Workspace 270 represents an area associated within facility 210 in which autonomous mobile robots 220 can move inventory holders 230 or in which autonomous mobile robots and inventory holders 230 can be stored. In some embodiments, inventory holders 230 can move themselves and store themselves in workspace 270. For example, workspace 270 may represent all or part of the floor of a mail-order warehouse in which facility 210 operates. Although FIG. 2 shows, for the purposes of illustration, an embodiment of facility 210 in which workspace 270 includes a fixed, predetermined, and finite physical space, particular embodiments of facility 210 may include autonomous mobile robots 220 and inventory holders 230 that are configured to operate within a workspace 270 that is of variable dimensions and/or an arbitrary geometry. While FIG. 2 illustrates a particular embodiment of facility 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, inventory management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of autonomous mobile robots 220, inventory holders 230, stations 250, and other components of facility 210. Depending on the component and the task to be completed, a particular task assignment 218 may identify locations, components, and/or actions associated with the corresponding task and/or any other appropriate information to be used by the relevant component in completing the assigned task. As described herein, a task may include a number and type of inventory items stored in inventory holders 230 that are required by each station 250 by a certain time limit (time constraint). Inventory management module 215 may select a particular autonomous mobile robot 220 to assign the relevant task based on the location or state of the particular autonomous mobile robot 220 as well as the particular inventory items stored in an inventory holder 230 in embodiments where autonomous mobile robots 220 are not required to transport the inventor holders 230 within workspace 270 for completing a task.

In embodiments where autonomous mobile robots 220 interact with inventory holders 230 and as part of completing these tasks autonomous mobile robots 220 may dock with and transport inventory holders 230 within workspace 270. Autonomous mobile robots 220 may dock with inventory holders 230 by connecting to, lifting, and/or otherwise interacting with inventory holders 230 in any other suitable manner so that, when docked, autonomous mobile robots 220 are coupled to and/or support inventory holders 230 and can move inventory holders 230 within workspace 270. Additionally, as noted herein, in particular embodiments, autonomous mobile robots 220 represent all or portions of inventory holders 230. In such embodiments, autonomous mobile robots 220 may not dock with inventory holders 230 as inventory holders 230 include the necessary components for moving and navigating through workspace 270 for completing tasks. Autonomous mobile robots 220 may each remain continually docked with a particular inventory holder 230.

While the appropriate components of facility 210 complete assigned tasks, inventory management module 215 may interact with the relevant components to ensure the efficient use of space, equipment, manpower, and other resources available to facility 210. As one specific example of such interaction, inventory management module 215 is responsible, in particular embodiments, for planning the paths (routes) autonomous mobile robots 220 and/or inventory holders 230 take when moving within workspace 270 and for allocating use of a particular portion of workspace 270 to particular autonomous mobile robots 220 and inventory holders 230 for purposes of completing an assigned task. In such embodiments, autonomous mobile robots 220 and/or inventory holders 230, in response to being assigned a task, request a path to a particular destination associated with the task.

Components of facility 210 may provide information to inventory management module 215 regarding their current state, other components of facility 210 with which they are interacting, and/or other conditions relevant to the operation of facility 210 including locations of components of facility 210 within the workspace 270. This may allow inventory management module 215 to utilize feedback from the relevant components to update algorithm parameters, adjust policies, or otherwise modify its decision-making to respond to changes in operating conditions or the occurrence of particular events (e.g., generate new tours and/or routes).

In addition, while inventory management module 215 may be configured to manage various aspects of the operation of the components of facility 210, in particular embodiments, the components themselves may also be responsible for decision-making relating to certain aspects of their operation, thereby reducing the processing load on inventory management module 215.

Thus, based on its knowledge of the location, current state, and/or other characteristics of the various components of facility 210 and an awareness of all the tasks currently being completed, inventory management module 215 can determine tasks, generate tours and routes for completing tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of facility 210 may be able to support a number of techniques for efficiently executing various aspects of the operation of facility 210. As a result, particular embodiments of the tour generation feature implemented by the inventory management module 215 and/or service provider computers (not pictured) may, by implementing one or more techniques described herein, enhance the efficiency of facility 210 and/or provide other operational benefits.

Figure 3:
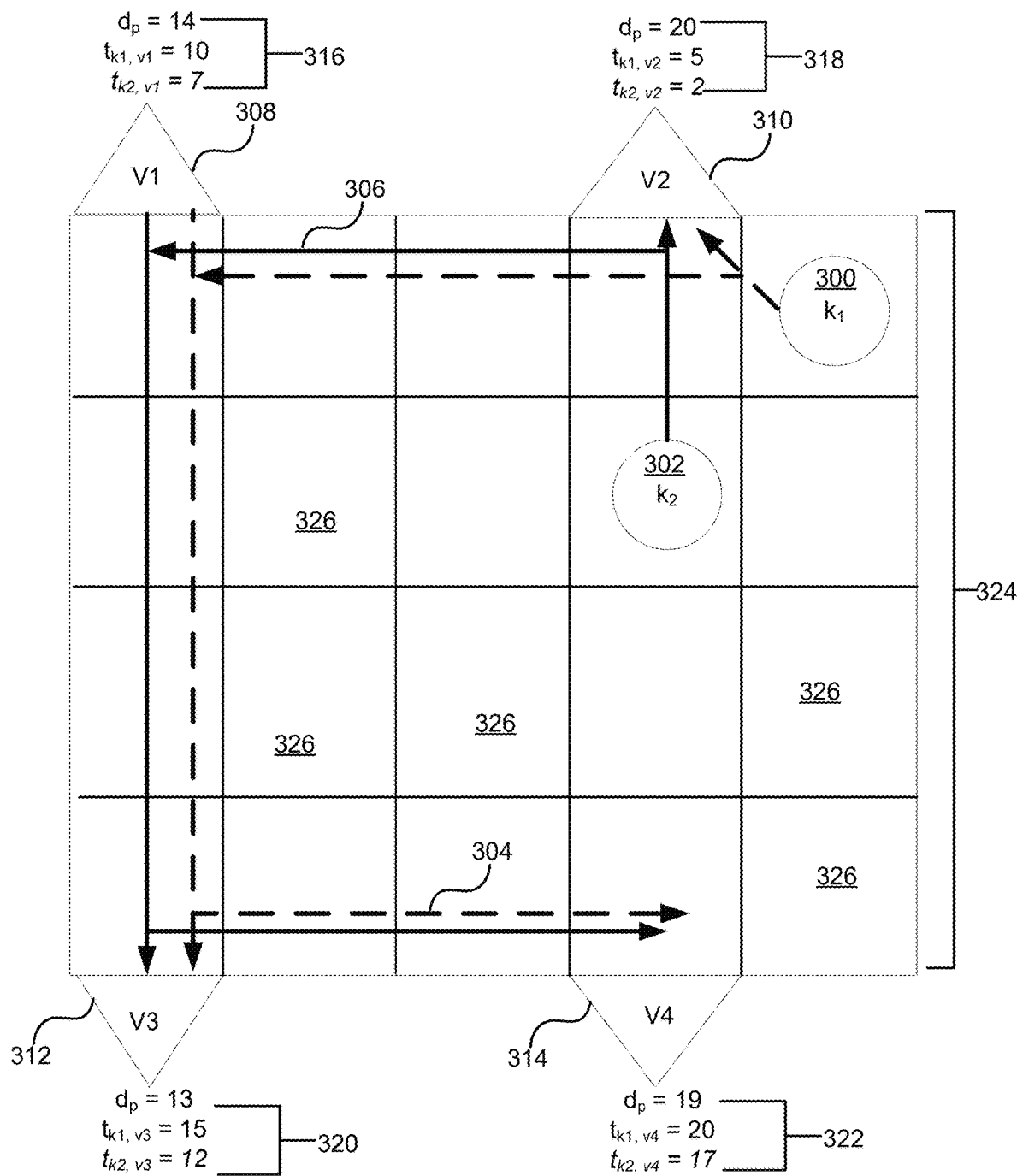
FIG. 3 depicts tours for agents traversing a facility to complete tasks that is generated by tour generation feature, in accordance with at least one embodiment.

FIG. 3 depicts tours for agents traversing a facility to complete tasks that is generated by tour generation feature, in accordance with at least one embodiment. FIG. 3 depicts agent $k_1$ 300 and agent $k_2$ 302, which may represent inventory holders of a facility, utilizing determined tours 304 and 306 (304 is represented by a dashed line whereas 306 is represented by the solid line). The tours 304 and 306 involve the agents $k_1$ 300 and $k_2$ 302 visiting each station, stations V1-V4 (308-314, respectively) by a certain time period to complete tasks (inventory transfer between inventory holders and stations for example). FIG. 3 also depicts the time data 316-322 for each station which depicts the time by which agents $k_1$ 300 and $k_2$ 302 needs to visit the associated station (represented as $d_p$), the time by which agent $k_1$ 300 reaches the associated station using tour 304 (represented by $t_{k1}$), and the time by which agent $k_2$ 302 reaches the associated station using tour 306 (represented by $t_{k2}$). FIG. 3 also depicts an area 324 of a facility that is represented in FIG. 3 as a number of grids 326. In embodiments, each grid 326 may be associated with a cost, in time, for traversing said grid by agents $k_1$ 300 and agent $k_2$ 302.

FIG. 3 depicts tours 304 and 306 using tour generation features described herein. For example, as illustrated in FIG. 3, tours 304 and 306 have agents $k_1$ 300 and $k_2$ 302 traversing the grids 326 of area 324 to visit each station 308-314 using a certain order (V2 310 first, V1 308 second, V3 312 third, and V4 314 last) so as to not exceed the certain time period required by each station 308-314. As described herein, the tour generation features implemented by the service provider computers may generate tours 304 and 306 for one or more inventory holders (agents $k_1$ 300 and $k_2$ 302) while taking into account travel time delays (travel attributes) of the inventory holders. For example, the service provider computers may obtain coordinates for starting locations of a plurality of inventory holders (agents $k_1$ 300 and $k_2$ 302), stations (V1-V4 308-314), and rest locations for the plurality of inventory holders. The service provider computers may determine a set of tasks for each station of a facility based on inventory item requirements associated with each station. Inventory item requirements may refer to inventory items required by each station by a certain time period in order to fulfill an inventory transfer request (e.g., transfer inventory item from a given inventory holder that stores the inventory item to the station as well as transfer the inventory item from the station to another component of a facility such as a delivery truck).

In embodiments, the service provider computers may determine travel attributes for the inventory holders and the tasks using drive physics of the inventory holders (e.g., known speed of the inventory holders given a current load), coordinates for the inventory holders and the stations, estimated time for an inventory transfer operation between a given inventory holder and a station, and travel time between locations of the facility (e.g., from a starting location to a station, from one station of the facility to another station). As solutions (tours) are determined for each inventory holder, in a certain priority order, the service provider computer may update the travel time estimation for each subsequent tour generated for other inventory holders thereby accounting for multiple inventory holders touring a given facility to perform tasks simultaneously. By accounting for travel time delays of the inventory holders as they complete tasks within the facility optimal tours can be generated for multiple inventory holders which may require visiting certain stations at the same time. In embodiments, the service provider computers may determine a priority order for a subset of inventory holders based on priority characteristics associated with each inventory holder of the subset. Priority characteristics may include identifying the inventory holder of the subset of inventory holders with a highest number of the inventory items required by the stations of the tasks and/or facility or randomly selecting an order for the subset of inventory holders. Priority characteristics may also include identifying the inventory holder with a furthest travel time from a starting location of the facility to a certain station based at least in part on the set of tasks, identifying the inventory holder with a shortest travel time from a starting location of the facility to a certain station based at least in part on the set of tasks, or identifying the inventory holder with a shortest time constraint associated with the set of tasks such as identifying an inventory holder which needs to reach a certain station according to a task in the shortest amount of time compared to the other inventory holders.

The service provider computers may determine a tour for each inventory holder of the subset of inventory holders based on the set of tasks for the stations, the coordinates of the inventory holders, stations, and starting locations of the inventory holders, and travel attributes for each inventory holder. As described herein, a tour identifies a specific order of stations that each inventory holder should visit and perform a task (transfer inventory item) to complete a set of tasks. Tasks may be associated with a certain time constraint or time period by which an inventory holder must visit it by and perform an inventory transfer operation. A set of tasks may have an overall time period or time constraint and each station making up a set of tasks may also be associated with a certain time period or time constraint as illustrated in FIG. 3. In accordance with at least one embodiment, the service provider computers may modify the determined tours for the subset of inventory holders by iteratively invoking a large neighborhood search algorithm that uses destroy heuristics. The service provider computers may use the destroy heuristics and large neighborhood search algorithm to destroy portions of a previously determined solution where the solution includes determined tours for the inventory holders to complete the tasks. The destroy heuristics may be used interchangeably between iterations.

Destroy heuristics may include randomly selecting a portion of the subset of inventory holders to remove, selecting a station of the stations to remove, or selecting a particular inventory holder of the subset of inventory holders to remove based at least in part on previously missed time constraints associated with the particular inventory holder for completing the tasks. The large neighborhood search algorithm may recalculate the tours for the remaining inventory holders and/or stations depending on the particular destroy heuristic utilized in a particular iteration thereby generating a new solution (tours) for the inventory holders to complete the tasks. If a more optimal solution (tours) for the subset of inventory holders is determined by the large neighborhood search algorithm, the service provider computers may update the travel attributes or time travel estimator utilized by the service provider computers for determining the tasks and tours for other subsets of inventory holders of a facility or for the current subset of inventory holders. In accordance with at least one embodiment, the service provider computers may update the previously determined tours for other subsets of inventory holders of the facility using the modified tours determined for the current subset of inventory holders. This can include updating the travel attributes or time travel estimation for the inventory holders to complete their tours given that tours have been determined for other inventory holders that will be navigating the facility and stations in question.

In embodiments, the service provider computers may determine a route for each inventory holder of the subset of inventory holders based on the modified tours for the subset of inventory holders. As described herein, a route may include specific coordinates, navigation commands (speed, steering, modulation and/or activation of propulsion components), and specification of inventory items for each inventory holder to utilize while completing a tour and performing an assigned task(s). The service provider computers may transmit the generated instructions to the inventory holder and/or propulsion component of the inventory holder. In some embodiments, the inventory holder may receive the instructions and the propulsion component may be activated, actuated, or modulated based on receiving the instructions. Returning to FIG. 3, the tours 304 and 306 represent tours generated by the tour generation feature described herein while taking into account travel attributes such as drive physics of the inventory holders (agents $k_1$ 300 and $k_2$ 302), coordinates for the stations (V1-V4 308-314), starting locations of the inventory holders (agents $k_1$ 300 and $k_2$ 302) as well as delays associated with transferring inventory upon visiting the stations V1-V4 (308-314). However, as illustrated in FIG. 3, the tours 304 and 306 include the same order of station visits (e.g., V2 310 first, V1 308 second, V3 312 third, and V4 314 last). By generating similar tours for agents $k_1$ 300 and $k_2$ 302 without taking into consideration a queuing time delay resulting from more than one inventory holder visiting a given station, agent $k_1$ misses the time deadline for station V4 314 (as depicted at 322). However, by utilizing a queuing time delay estimation as illustrated in FIG. 4 below, other optimized tours may be generated for maximizing use of the components of a facility and reducing delays.

Figure 4:
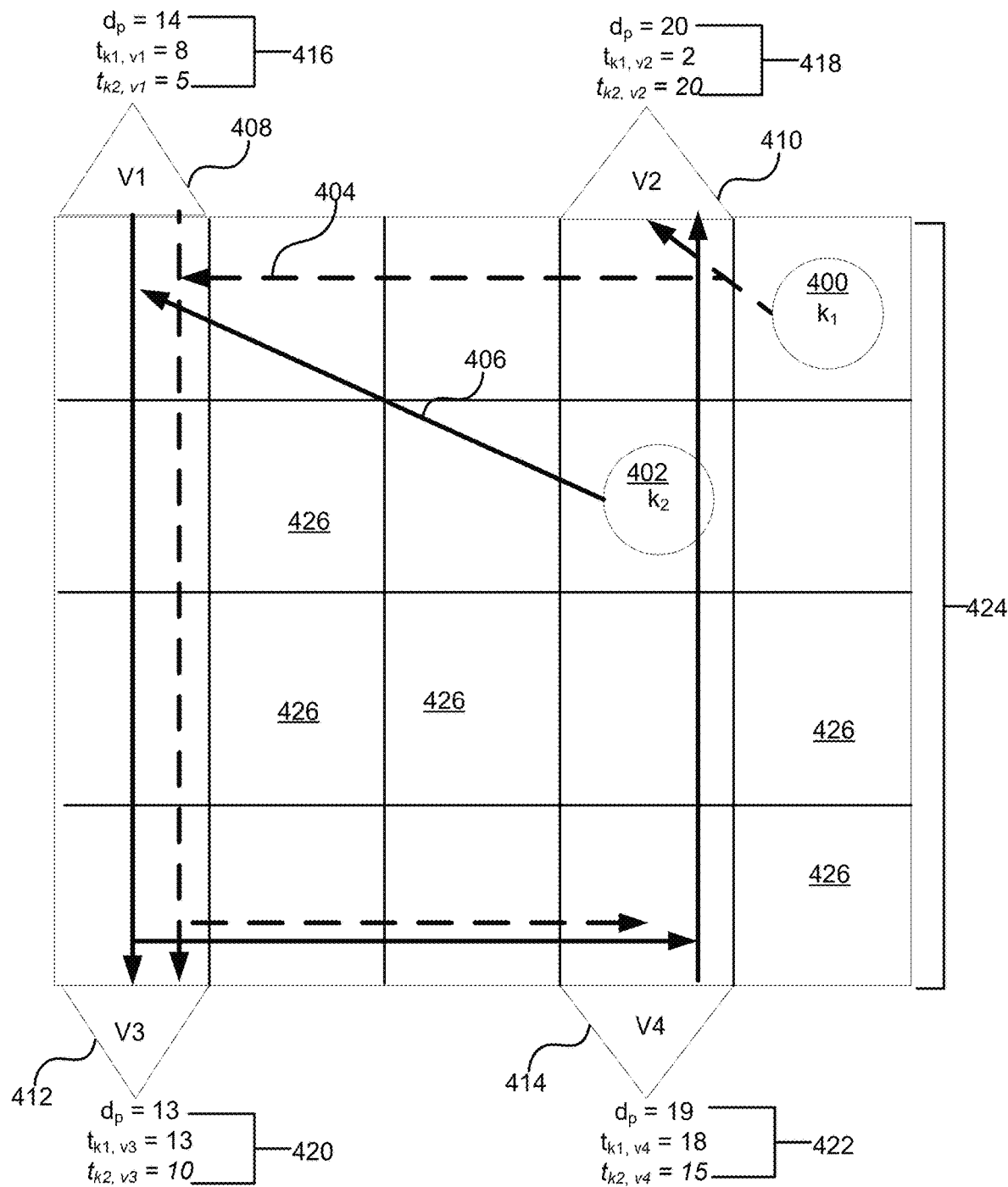
FIG. 4 depicts tours for agents traversing a facility to complete tasks that is generated by tour generation feature, in accordance with at least one embodiment.

FIG. 4 depicts tours for agents traversing a facility to complete tasks that is generated by tour generation feature, in accordance with at least one embodiment. FIG. 4 depicts agent $k_1$ 400 and agent $k_2$ 402, which may represent inventory holders of a facility, utilizing determined tours 404 and 406 (404 is represented by a dashed line whereas 406 is represented by the solid line). The tours 404 and 406 involve the agents $k_1$ 400 and $k_2$ 402 visiting each station, stations V1-V4 (408-414, respectively) by a certain time period to complete tasks (inventory transfer between inventory holders and stations for example). FIG. 4 also depicts the time data 416-422 for each station which depicts the time by which agents $k_1$ 400 and $k_2$ 402 needs to visit the associated station (represented as $d_p$), the time by which agent $k_1$ 400 reaches the associated station using tour 404 (represented by $t_{k1}$), and the time by which agent $k_2$ 402 reaches the associated station using tour 406 (represented by $t_{k2}$). FIG. 4 also depicts an area 424 of a facility that is represented in FIG. 4 as a number of grids 426. In embodiments, each grid 426 may be associated with a cost, in time, for traversing said grid by agents $k_1$ 400 and agent $k_2$ 402.

FIG. 4 depicts tours 404 and 406 using tour generation features described herein. For example, as illustrated in FIG. 4, tours 404 and 406 have agents $k_1$ 400 and $k_2$ 402 traversing the grids 426 of area 424 to visit each station 408-414 using a certain order so as to not exceed the certain time period required by each station 408-414. As described herein, the tour generation features implemented by the service provider computers may generate tours 404 and 406 for one or more inventory holders (agents $k_1$ 400 and $k_2$ 402) while taking into account travel time delays (travel attributes) of the inventory holders as well as queuing time delays caused by multiple inventory holders potentially visiting a same station. As illustrated in FIG. 4 and in comparison to FIG. 3, agents $k_1$ 400 and $k_2$ 402 each visit a different station at the beginning of their tour. For example, agent $k_1$ 400 visits station V2 410 first whereas agent $k_2$ 402 visits station V1 408 first. As depicted b time data 416-422, each agent $k_1$ 400 and $k_2$ 402 completes their respective tour (404 or 406) within the time constraint set for each station V1-V4 (408-414). The service provider computers implementing the tour generation feature can generate optimal routes 404 and 406 by taking into account the travel attributes which include not only time travel delays resulting from the inventory holders themselves, size of the facility, location of the stations, etc., but also factoring in the queue time delays resulting from multiple inventory holders visiting a same station. It should be understood that optimal routes 404 and 406 depicted in FIG. 4 do not include any overlap of visiting the same station at any given time period. However, in real world scenarios where the service provider computers are determining tours for hundreds of inventory holders of a facility at the same time, some inventory holders may be queued at the same station awaiting their turn to perform their associated task. The tours generated by the service provider computers using the travel attribute that include time travel delays as well as queue time delays will still be more optimized to utilize the resources of a facility compared to conventional tour generation methods for agents.

Figure 5:
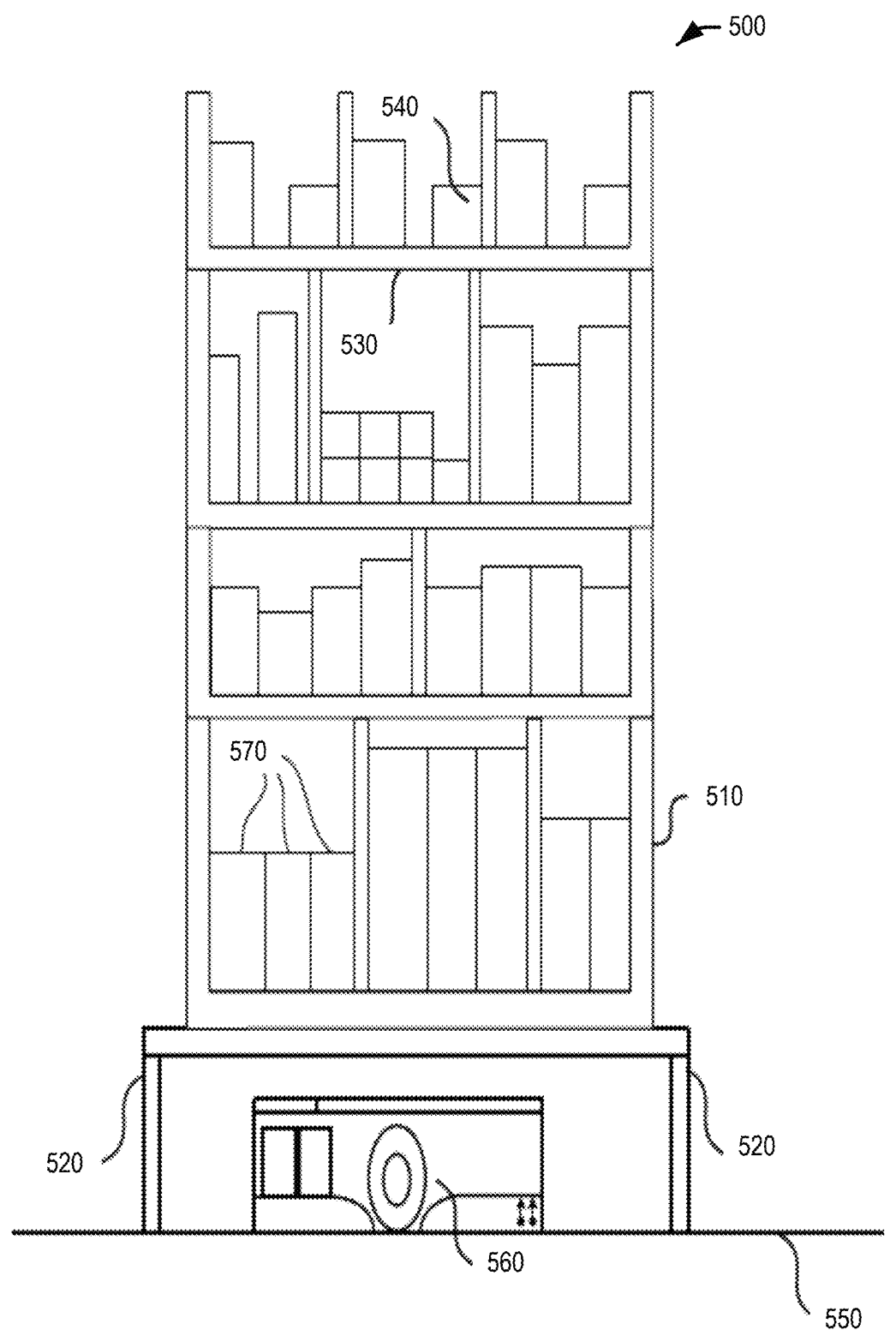
FIG. 5 depicts an example inventory holder that may be utilized in particular embodiments of tour generation feature for completing tasks within a facility of an inventory management system, in accordance with at least one embodiment.

FIG. 5 depicts an example inventory holder that may be utilized in particular embodiments of tour generation feature for completing tasks within a facility of an inventory management system, in accordance with at least one embodiment. In particular, FIG. 5 illustrates the structure and contents of one side of an example inventory holder 500. In a particular embodiment, inventory holder 500 may comprise any number of faces with similar or different structure. As illustrated, inventory holder 500 includes a frame 510, a plurality of legs 520, and one or more shelves 530 for storing inventory in containers 540 of various sizes. Although FIG. 5 illustrates the inventory holder 500 storing inventory in containers 540, embodiments described herein include the inventory holder 500 storing inventory that is not in containers 540. In some configurations for inventory holders 500, the plurality of legs 520 are situated in such a way as to place the frame 510 above a surface 550 of a facility.

The frame 510 of the inventory holder 500 may rest a variable height above the surface 550 of the facility to allow for one or more autonomous mobile robots 560 to move underneath. For example, in response to instructions from the service provider computers 810 and/or inventory management module 844, the autonomous mobile robot 560 may move below or underneath the inventory holder 500 to free up space or clear a path for a human operator or other autonomous mobile robot to move past the inventory holder 500 within the facility. In embodiments, the autonomous mobile robot 560 may include a robotic arm or other component (not pictured) which may be configured to collapse for temporary storage with the autonomous mobile robot 560 underneath the inventory holder 500. The robotic arm or other component (not pictured) may be configured to move inventory items 570 between the inventory holder 500 and another inventory holder and/or a station of the facility. In accordance with at least one embodiment, the configuration of the inventory holder 500, frame 510, and plurality of legs 520 may be such that one or more autonomous mobile robots 560 may be temporarily stored underneath or travel from one point to another in the facility by traveling underneath the inventory holder 500. Instructions provided by the service provider computers 810 and/or inventory management module 844 to the autonomous mobile robot 560 may cause the autonomous mobile robot 560 to carry, slide, or otherwise move the inventory holder 500 throughout a facility to complete one or more tasks associated with a tour and route as described herein. Although FIG. 5 depicts an autonomous mobile robot 560 that is configured to move the inventory holder 500 and interact with inventory holder 500 to transport inventory items 570 according to tasks, embodiments described herein are not as limited. For example, in embodiments described herein inventory holder 500 may move throughout the facility without the aid of the autonomous mobile robot 560 using its own propulsion components and based on instructions provided by the service provider computers 810 and/or inventory management module 844. In such embodiments, the inventory holder 500 may use its own associated robotic arm or other suitable component for transferring inventory items 570 to other inventory holders and/or stations throughout a facility to complete one or more tasks associated with a tour and route as described herein.

Figure 6:
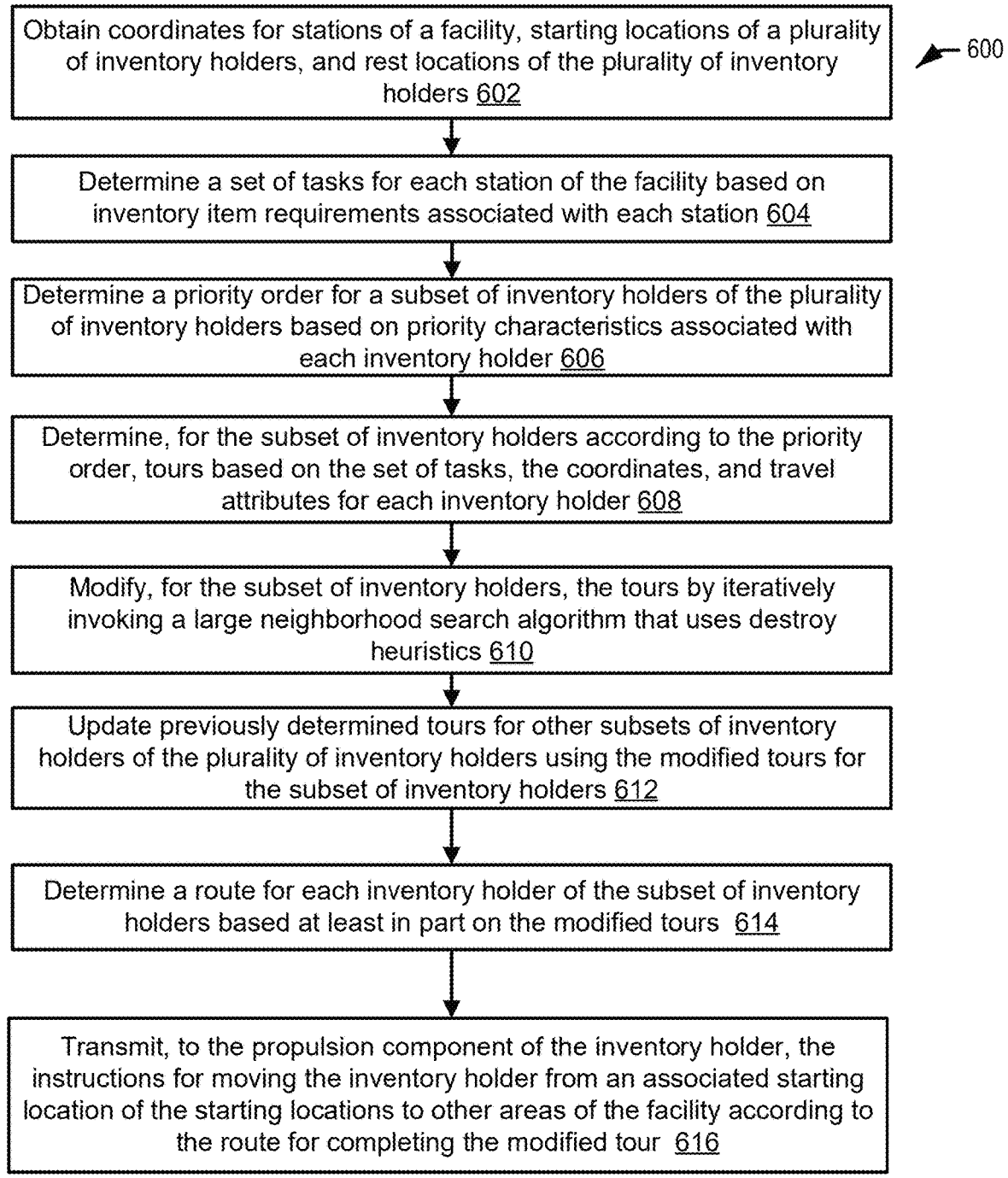
FIG. 6 depicts an example flow chart for a tour generation feature, in accordance with at least one embodiment.
Figure 7:
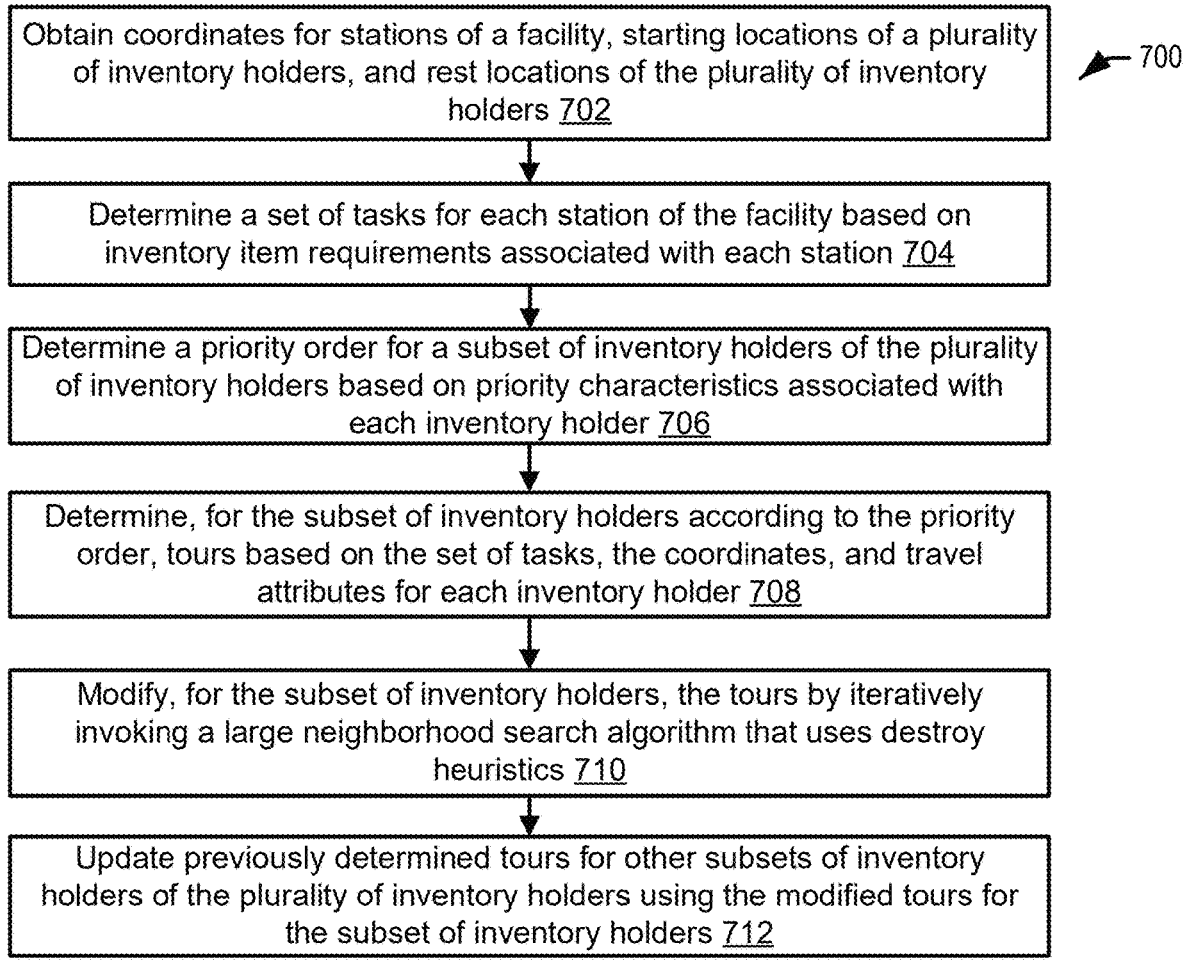
FIG. 7 depicts an example flow chart for a tour generation feature, in accordance with at least one embodiment.

FIGS. 6 and 7 illustrate example flow charts for tour generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 8:
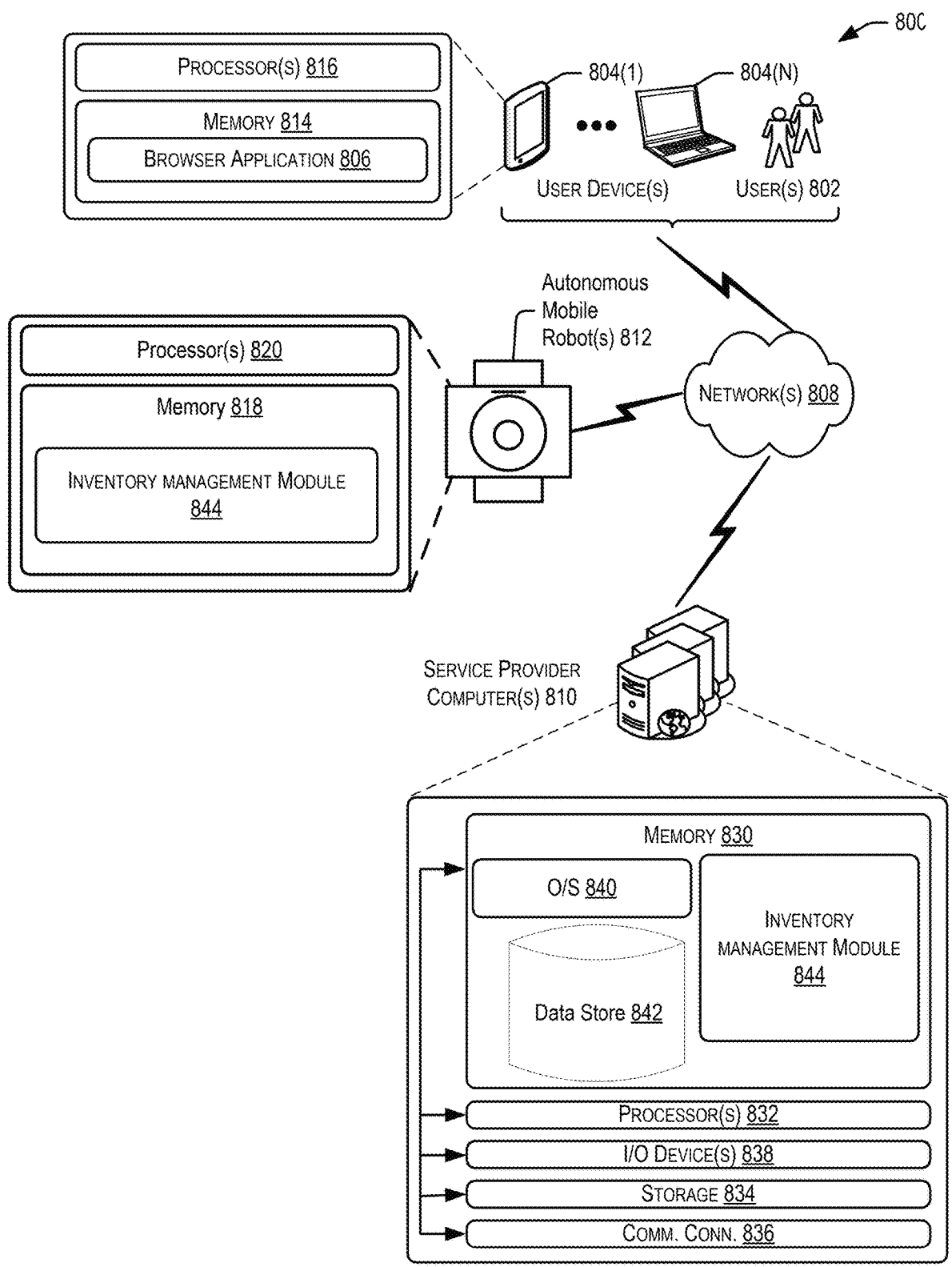
FIG. 8 depicts an example architecture for a tour generation feature that includes one or more service provider computers, a user device, and an autonomous mobile robot, in accordance with at least one embodiment.

In some examples, service provider computers (service provider computers 810) utilizing at least the inventory management module 844 depicted in FIG. 8 may perform the processes 600 and 700 of FIGS. 6 and 7. In FIG. 6, the process 600 may include obtaining coordinates for stations of a facility, starting locations of a plurality of inventory holders, and rest locations of the plurality of inventory holders at 602. The process 600 may include determining a set of tasks for each station of the facility based on inventory item requirements associated with each station at 604. The process 600 may include determining a priority order for a subset of inventory holders of the plurality of inventory holders based on priority characteristics associated with each inventory holder at 606. The process 600 may include determining, for the subset of inventory holders according to the priority order, tours based on the set of tasks, the coordinates, and travel attributes for each inventory holder at 608.

In embodiments, the process 600 may include modifying, for the subset of inventory holders, the tours by iteratively invoking a large neighborhood search algorithm that uses destroy heuristics at 610. The process 600 may include updating previously determined tours for other subsets of inventory holders of the plurality of inventory holders using the modified tours for the subset of inventory holders at 612.

The process 600 may include determining a route for each inventory holder of the subset of inventory holders based at least in part on the modified tours at 614. The process 600 may include transmitting, to the propulsion component of the inventory holder, the instructions for moving the inventory holder from an associated starting location of the starting locations to other areas of the facility according to the route for completing the modified tour at 616. In embodiments, the route for each inventory holder may include instructions or coordinates which correspond to a temporary rest location in the facility. Inventory holders may be parked or at rest at said rest locations to enable other inventory holders to travel within the facility to complete their own tasks, reduce queue times at stations, or for other reasons. The presence of temporary rest locations may be incorporated into the generation of a tour as well and used when generating a route for a given inventory holder. A route may also include coordinates and instructions for navigating an inventory holder to a rest location upon completion of a tour and tasks assigned to the inventory holder.

In FIG. 7, the process 600 may include obtaining coordinates for stations of a facility, starting locations of a plurality of inventory holders, and rest locations of the plurality of inventory holders at 702. The process 700 may include determining a set of tasks for each station of the facility based on inventory item requirements associated with each station at 704. The process 700 may include determining a priority order for a subset of inventory holders of the plurality of inventory holders based on priority characteristics associated with each inventory holder at 706. The process 700 may include determining, for the subset of inventory holders according to the priority order, tours based on the set of tasks, the coordinates, and travel attributes for each inventory holder at 708.

In embodiments, the process 700 may include modifying, for the subset of inventory holders, the tours by iteratively invoking a large neighborhood search algorithm that uses destroy heuristics at 710. The process 700 may include updating previously determined tours for other subsets of inventory holders of the plurality of inventory holders using the modified tours for the subset of inventory holders at 712.

FIG. 8 depicts an example architecture for a tour generation feature that includes one or more service provider computers, a user device, and an autonomous mobile robot, in accordance with at least one embodiment. In architecture 800, one or more users 802 (e.g., inventory management system administrators or working entities associated with the inventory management system) may utilize user computing devices 804(1)-(N) (collectively, user devices 304) to access a browser application 806 or a user interface (UI) accessible through the browser application 806, via one or more networks 808 to request information about the inventory management system and/or facility, and one or more autonomous mobile robots 812 navigating the facility the service provider computers 810 and/or from the autonomous mobile robot(s) 812. The "browser application" 806 can be any browser control or native application that can access and display a network page or other information. A native application may include an application or program that has been developed for use on a particular platform (such as an operating system) or a particular device (such as a particular type of mobile device).

In accordance with at least one embodiment, the user devices 804 may be configured for communicating with an autonomous mobile robot 812 via networks 808. In embodiments, the user device 804 may include a dedicated device or a wearable device. The dedicated or wearable devices may include memory and processors similar to the memory 814 and processors 816 of the user devices 304. It should be noted that although autonomous mobile robot(s) 812 are illustrated and described with reference to FIG. 8 the embodiments of the disclosure include an inventory holder which includes a processor, memory, and any suitable applications and modules similar to autonomous mobile robot(s) 812. Embodiments disclosed herein include autonomous mobile robot(s) 812 traveling to inventory holders and moving them throughout a facility according to a tour to complete tasks as well as the inventory holders themselves moving without the aid of autonomous mobile robot(s) 812 (e.g., the inventory holders serve as the autonomous mobile robot(s) 812) throughout the facility according to the tour to complete the tasks.

The architecture 800 may also include autonomous mobile robot(s) 812 that may be configured to move/navigate within the inventory management system, facility, or workspace and slow down, navigate or steer around detected objects in a travel path, or stop in response to sensor information from one or more sensors (not pictured) associated with the autonomous mobile robot(s) 812. In embodiments, the autonomous mobile robot(s) 812 may be an example of an autonomous mobile robot or inventory holders as described herein. The autonomous mobile robot(s) 312 may include at least one memory 318 and one or more processing units or processor(s) 320. The memory 318 may store program instructions that are loadable and executable on the processor(s) 320, as well as data generated during the execution of these programs. Depending on the configuration and type of autonomous mobile robot(s) 812, the memory 818 may be volatile (such as random access memory (RAM)) and/or non-volatile (such as read-only memory (ROM), flash memory, etc.). The autonomous mobile robot(s) 812 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the autonomous mobile robot(s) 812. In some implementations, the memory 818 may include multiple different types of memory, such as static random access memory (SRAM), dynamic random access memory (DRAM), or ROM. In embodiments, the autonomous mobile robot(s) 812 may include one or more sensors such as obstacle detection sensors and safety sensors (not pictured) for detecting objects and avoiding colliding with said objects within a facility.

In an embodiment, the obstacle detection sensors (not pictured) may be configured to identify or detect an object or obstacle within a certain distance of the autonomous mobile robot(s) 812 up to the sensors capabilities. In accordance with at least one embodiment, the obstacle detection sensors (not pictured) may include one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning light detection and ranging (LIDAR) sensor or other suitable light pulse laser ranging sensors; and/or three dimensional imagers such as the LIDAR sensor, a solid-state LIDAR, a time-of-flight camera (s), stereo cameras both active and passive, structured light cameras, or radio detection and ranging (Radar) transmitters and receivers. In accordance with at least one embodiment, the safety sensors (not pictured) can include one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning light detection and ranging (LIDAR) sensor or other suitable light pulse laser ranging sensors; and/or three dimensional imagers such as the LIDAR sensor, a solid-state LIDAR, a time-of-flight camera(s), stereo cameras both active and passive, structured light cameras, or radio detection and ranging (Radar) transmitters and receivers. In some embodiments, the autonomous mobile robot(s) 812 may be in communication with one or more sensors that are external (not associated with or operatively attached to the autonomous mobile robot(s) 812) that are located throughout a facility and/or workspace.

Turning to the contents of the memory 818 in more detail, the memory 818 may include an operating system and one or more application programs or services for implementing the features disclosed herein. Additionally, the memory 818 may include an inventory management module 844. The autonomous mobile robot(s) 812 may also include geo-location devices (e.g., a global positioning system (GPS) device or the like) (not pictured) for providing and/or recording geographic location information associated with the autonomous mobile robot(s) 812 and comparing the information maintained by the service provider computers 810. In embodiments, the autonomous mobile robot(s) 812 may also utilize other sensor technologies for determining location information such as imaging devices, scanners, radio frequency identification (RFID) readers that are configured to read fiducial markings, barcodes, RFID tags, or other identifiers from the surrounding environment (such as markings or identifiers located on inventory holders, walls, barriers, or other surfaces of a facility or workspace) to determine their own location and/or enter one or more modes such as a rest state, an interaction state for interacting with one or more stations of a facility, or a navigation state for traveling from station to station of a tour for completing a task within the facility as described herein.

In embodiments, the inventory management module 844 may be configured to obtain information for a facility as well as components of the facility (e.g., number and type of stations, autonomous mobile robot(s) (inventor holders) 812), coordinates of stations, start locations, rest locations for autonomous mobile robot(s) 812, as well as operational status of the components of the facility. The inventory management module 844 may be configured to determine tasks for the stations of the facility based on inventory item requirements associated with each station. The inventory management module 844 may be configured to determine or assign a time constraint (specific time period) by which a task for a said station or stations must be completed by. In accordance with at least one embodiment, the inventory management module 844 may be configured to determine a priority order for a subset of inventory holders based on priority characteristics associated with each inventor holder (e.g., based on which inventory holder has the most items, a potential longest journey throughout the facility to complete a task(s), shortest journey throughout the facility to complete a task(s), etc.). The inventory management module 844 may be configured to determine, for each inventory holder of the subset of inventory holders and according to the priority order determined for the subset of inventory holders, a tour based on the set of tasks, the coordinates or information of the facility and components of the facility, and travel attributes for each inventory holder. In embodiments, the inventory management module 844 may be configured to modify the determined tours for the subset of inventory holders by iteratively invoking (executing) a large neighborhood search algorithm that uses destroy heuristics to generate an optimal solution (tours) for the subset of the inventory holders. The inventory management module 844 may be configured to update previously determined tours for other subsets of inventory holders using the modified tours for the subset of inventory holders thereby generating an optimal solution for all the plurality of inventor holders executing tasks in a facility. In accordance with at least one embodiment, the inventory management module 844 may be configured to determine a route for each inventory holder of the subset of inventory holders based on the modified tours for the subset of inventory holders. In embodiments, the inventory management module 844 may be configured to generate and transmit instructions to the autonomous mobile robot(s) 812 for actuating or activating the propulsion components of the autonomous mobile robot(s) 812 for moving throughout the facility to complete the assigned task for interacting with a set of stations corresponding to the assigned task using the route generated by the inventory management module 844. The instructions generated by the inventory management module 844 and transmitted to the autonomous mobile robot(s) 812 may instruct the propulsion mechanisms of the autonomous mobile robot(s) 812 may update a steering, direction, and speed for the autonomous mobile robot(s) 812 to utilize while navigating the facility or workspace to complete an assigned task according to its assigned tour and route.

The architecture 800 may also include one or more service provider computers 810 that may, in some examples, provide computing resources such as, but not limited to, client entities, low latency data storage, durable data storage, data access, management, virtualization, hosted computing environment or "cloud-based" solutions, electronic content performance management, etc. The service provider computers 810 may also be operable to provide site hosting, computer application development, and/or implementation platforms, combinations of the foregoing, or the like to the one or more users 802 via user devices 804 and/or provide access to the autonomous mobile robot(s) 812.

In some examples, the networks 808 may include any one or a combination of many different types of networks, such as cable networks, the Internet, wireless networks, cellular networks and other private and/or public networks. While the illustrated example represents the users 802 and autonomous mobile robot(s) 812 communicating with the service provider computers 810 over the networks 808, the described techniques may equally apply in instances where the users 802 interact with the service provider computers 810 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The service provider computers 810 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 810 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the service provider computers 810 may be in communication with the user device 804 and autonomous mobile robot(s) 812 via the networks 808, or via other network connections. The service provider computers 810 may include one or more servers, perhaps arranged in a cluster or as individual servers not associated with one another.

In one illustrative configuration, the service provider computers 810 may include at least one memory 830 and one or more processing units or processors(s) 832. The processor(s) 832 may be implemented as appropriate in hardware, computer-executable instructions, firmware, or combinations thereof. Computer-executable instruction or firmware implementations of the processor(s) 832 may include computer-executable or machine-executable instructions written in any suitable programming language to perform the various functions described when executed by a hardware computing device, such as a processor.

The memory 830 may store program instructions that are loadable and executable on the processor(s) 832, as well as data generated during the execution of these programs. Depending on the configuration and type of the service provider computers 810, the memory 830 may be volatile (such as RAM) and/or non-volatile (such as ROM, flash memory, etc.). The service provider computers 810 or servers may also include additional storage 834, which may include removable storage and/or non-removable storage. The additional storage 834 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 830 may include multiple different types of memory, such as SRAM, DRAM, or ROM.

The memory 830, the additional storage 834, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 830 and the additional storage 834 are all examples of non-transitory computer storage media. Additional types of non-transitory computer storage media that may be present in the service provider computers 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 810. Combinations of any of the above should also be included within the scope of non-transitory computer-readable media.

The service provider computers 810 may also contain communication connection interface(s) 836 that allow the service provider computers 810 to communicate with a data store, another computing device or server, user terminals and/or other devices on the networks 808. The service provider computers 810 may also include I/O device(s) 838, such as a keyboard, a mouse, a pen, a voice input device, a touch input device, a display, speakers, a printer, etc.

Turning to the contents of the memory 830 in more detail, the memory 830 may include an operating system 840, one or more data stores 842, and/or one or more application programs or services for implementing the features disclosed herein including the inventory management module 844.

In accordance with at least one embodiment, the tour generation features implemented by the service provider computers 810 along with autonomous mobile robot(s) 812 may be utilized in an inventory management system similar to the inventory systems disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS." An inventory management system may include the service provider computers 810, one or more autonomous mobile robot(s) 812, one or more inventory holders, one or more inventory stations (stations), and one or more areas of a facility (e.g., start location, rest location etc.).

The service provider computers 810 and inventory management module 844 may generate tasks for the autonomous mobile robot(s) 812 to transfer inventory or other items within the facility using the inventory holders or otherwise interact with inventory stations. The autonomous mobile robot(s) 812 are capable of moving or transferring inventory items between locations within a facility or workspace to facilitate the entry, processing, and/or removal of inventory items from inventory holders or complete other tasks related to inventory items at said stations of the facility. The service provider computers 810 and inventory management module 844 may assigns tasks to appropriate components of a facility and coordinate operation of the various components in completing the tasks such as based on inventory item requirements of the stations of the facility. These tasks may relate not only to the movement and processing of inventory items, but also to the management and maintenance of the components of the facility. For example, service provider computers 810 may assign portions of a facility as parking spaces (rest locations or starting locations) for autonomous mobile robot(s) 812, the scheduled recharge or replacement of batteries for the autonomous mobile robot(s) 812, the storage of empty inventory holders, identity and location of autonomous mobile robots in the facility/workspace, or any other operations associated with the functionality supported by the service provider computers 810 and its various components. Although FIG. 8 illustrates a single autonomous mobile robot 812, peer to peer communication between multiple autonomous mobile robots 812 and/or the service provider computers 810 may occur.

Autonomous mobile robot(s) 812 may move inventory holders between locations within a workspace, facility, or an unbounded area. Autonomous mobile robot(s) 812 may represent any devices or components appropriate for use in an inventory management system, facility, or workspace based on the characteristics and configuration of inventory holders, items, and/or other elements of inventory management system, facility, or workspace. The autonomous mobile robot(s) 312 represent an independent, self-powered device configured to freely move about a workspace, facility, inventory management system, or unbounded area to complete assigned tasks. Additionally, the autonomous mobile robot(s) 812 may be capable of communicating with the service provider computers 810, stations of a facility, and/or other autonomous mobile robots to receive information identifying inventory holders, transmit the locations of autonomous mobile robots, or exchange any other suitable information to be used by the service provider computers 810 or autonomous mobile robot(s) 812 during operation. Autonomous mobile robot(s) 812 may communicate with the service provider computers 810 and other autonomous mobile robots wirelessly, using access points (not pictured) located within or about the workspace, facility, inventory management system, or unbounded area, and/or in any other appropriate manner. As one example, particular embodiments of the autonomous mobile robot(s) 812 may communicate with the service provider computers 810 and/or with one another using 802.11, Bluetooth, or Infrared Data Association (IrDA) standards, or any other appropriate wireless communication protocol via the access points. Inventory holders may store inventory items. In a particular embodiment, inventory holders may include multiple storage bins (containers) with each storage bin (container) capable of holding one or more types of inventory items. Inventory holders may be capable of being carried, rolled, and/or otherwise moved by the autonomous mobile robot(s) 812. In embodiments described herein, inventory holders may include components similar to autonomous mobile robot(s) 812, including propulsion components, for moving themselves and completing tasks at stations of a facility. A workspace, facility, or inventory management system may include a fixed, predetermined, and finite physical space, and particular embodiments of the tour generation feature may include the autonomous mobile robot(s) 812 being configured to operate within a workspace that is of variable dimensions and/or an arbitrary geometry such as unbounded area. A workspace, facility, or inventory management system may be entirely enclosed in a building, and alternative embodiments may utilize workspaces in which some or all of the workspace is located outdoors, within a vehicle (such as a cargo ship), or otherwise unconstrained by any fixed structure or associated with an unbounded area.

In operation, the service provider computers 810 may select appropriate components to complete particular tasks and transmits task assignments to the selected components to trigger completion of the relevant tasks. Each task assignment defines one or more tasks to be completed by a particular component. These tasks may relate to the retrieval, storage, replenishment, and counting of inventory items and/or the management of the autonomous mobile robot(s) 812, inventory holders, inventory stations, and other components of an inventory management system, workspace, or facility. Depending on the component and the task to be completed, a particular task assignment may identify locations, components, and/or actions associated with the corresponding task and/or any other appropriate information to be used by the relevant component in completing the assigned task including generated tours and routes.

In particular embodiments, the service provider computers 810 generates task assignments based, in part, on inventory requests or item inventory requirements of stations of the facility that the service provider computers 810 receives from other components of a facility and/or from external components in communication with the service provider computers 810. These inventory requests and or item inventory requirements identify particular operations to be completed involving inventory items stored or to be stored within a facility and may represent communication of any suitable form. For example, in particular embodiments, item inventory requirements may represent a shipping order specifying particular inventory items that have been purchased by a customer and that are to be retrieved from various inventory holders for shipment to the customer. Upon an autonomous mobile robot 812 receiving a task, tour, and route, the autonomous mobile robot 812 may complete the task with no further communication from the service provider computers 810.

As used herein, the phrase "access points" includes devices that act as transmitters and receivers of local area wireless network signals (e.g., "Wi-Fi", Long Term Evolution (LTE), Bluetooth, WirelessHD and WiGig, and Z-Wave). Location information may include an ID of the autonomous mobile robot(s) 812, X, Y and Z coordinates of the autonomous mobile robot(s) 812 in a facility, a timestamp from when the autonomous mobile robot(s) 812 that sent the information to the computer system, roam time between access points (the time period for the autonomous mobile robot unit to successfully switch from one access point to another within the facility), received signal strength indicators, timeouts that occur when at least one autonomous mobile robot switches from one access point to another, beacons from the access points, and/or bitrates. As used herein, the phrase "autonomous mobile robot" may include a unit, such as an inventory holder, that is capable of moving within the inventory management system, facility, or workspace without human input and may include any appropriate components for propelling itself and navigating to a particular destination within the inventory management system, facility, or workspace. The autonomous mobile robot(s) 812 may also be capable of gathering and sending information about the facility's network connectivity. A mobile drive unit/AGV/drive unit/inventory holder may be a type of autonomous mobile robot 812, in particular, an autonomous ground vehicle.

Figure 9:
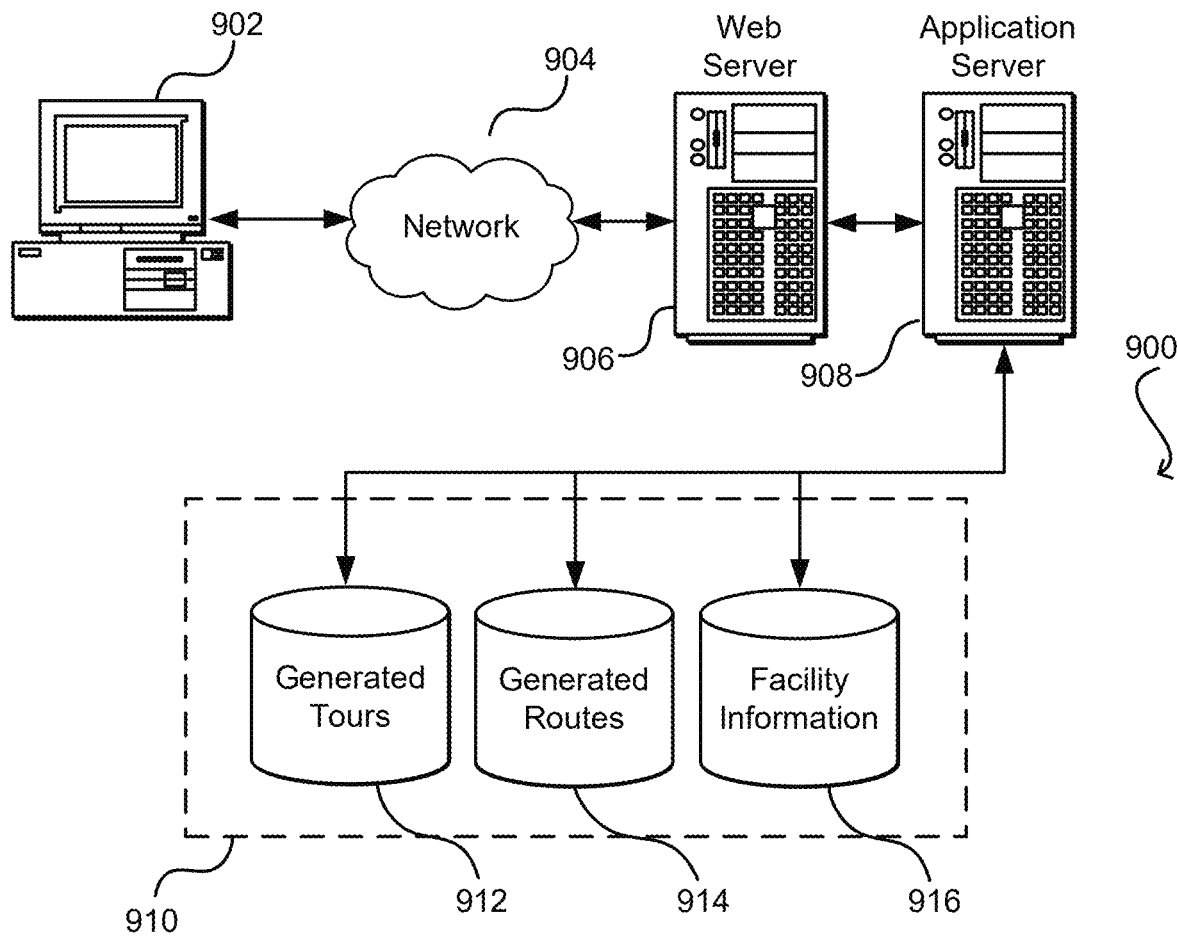
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network 904 can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 908 can include any appropriate hardware and software for integrating with the data store 910 as needed to execute aspects of one or more applications for the client device 902, handling a majority of the data access and business logic for an application. The application server 908 provides access control services in cooperation with the data store 910 and is able to generate content such as text, graphics, audio, and/or video to be transferred to the user, which may be served to the user by the Web server 906 in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server 906 via network 904. It should be understood that the Web and application servers (906 and 908) are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing generated tours 912 and facility information 916, which can be used to serve content for the production side as well as generate routes and instructions for propulsion components of inventory holders or other components of a facility. The content generated using the generated tours 912 and facility information 916 may include responses to queries or requests by a user interacting with client device 902 regarding tours generated for inventory holders, operational status information for inventory holders or stations of a facility, or other similar requests or queries. In accordance with at least one embodiment, tours may be determined for stations and inventory holders based on the operation status information of the inventory holders and/or the stations of a facility. In embodiments, the client device 902 can include an inventory holder and/or an autonomous mobile robot interacting with and moving an inventor holder of a facility. The data store 910 also is shown to include a mechanism for storing generated routes 914, which can be used for reporting, analysis, or other such purposes such as instructions which can be transmitted to components of a facility (e.g., inventory holders and/or autonomous mobile robots) for completing tours and tasks for said tours. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a request for a tour and/or route generated for a particular inventory holder of a facility. In this case, the data store 910 might access the generated tours 912 and/or generated routes 914 as well as facility information to verify an identity of the particular inventory holder and associated facility and obtain the routes or tours for the particular inventory holder. The information then can be returned to the user, such as by updating a user interface presented on a Web page that the user is able to view via a browser on the client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle©, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computer system, coordinates for stations of a facility, starting locations of a plurality of inventory holders of the facility, and rest locations of the plurality of inventory holders, the stations configured to receive and transfer inventory items from the plurality of inventory holders according to tasks, an inventory holder of the plurality of inventory holders configured to move, within the facility using an associated propulsion component, according to instructions received from the computer system, the inventory holder comprising one or more containers for storage of the inventory items;
   determining, by the computer system, a set of tasks for each station of the stations of the facility based at least in part on inventory item requirements associated with each station, the set of tasks for each station associated with a time constraint;
   determining, by the computer system, a priority order for a subset of inventory holders of the plurality of inventory holders based at least in part on priority characteristics associated with each inventory holder of the subset of inventory holders;
   determining, by the computer system and for the subset of inventory holders according to the priority order, tours based at least in part on the set of tasks, the coordinates, and travel attributes for each inventory holder, a tour of the tours identifying an order for each station of the stations to be visited by an inventory holder of the subset of inventory holders for completing a task of the set of tasks within the time constraint for each station;
   modifying, by the computer system and for the subset of inventory holders, the tours by iteratively invoking a large neighborhood search algorithm that uses destroy heuristics;
   updating, by the computer system, previously determined tours for other subsets of inventory holders of the plurality of inventory holders using the modified tours for the subset of inventory holders;
   determining, by the computer system, a route for each inventory holder of the subset of inventory holders based at least in part on the modified tours for the subset of inventory holders, the route identifying the coordinates for a subset of stations of the stations corresponding to a modified tour of the modified tours for completing the set of tasks associated with the subset of stations by the time constraint; and
   transmitting, by the computer system and to the propulsion component of the inventory holder, the instructions for moving the inventory holder from an associated starting location of the starting locations to other areas of the facility according to the route for completing the modified tour.

2. The computer-implemented method of claim 1, wherein the priority characteristics include one or more of identifying the inventory holder of the subset of inventory holders with a highest number of the inventory items, randomly selecting the priority order for the subset of inventory holders, identifying the inventory holder with a furthest travel time based at least in part on the set of tasks, identifying the inventory holder with a shortest travel time based at least in part on the set of tasks, or identifying the inventory holder with a shortest time constraint associated with the set of tasks.

3. The computer-implemented method of claim 1, wherein the destroy heuristics include one or more of randomly selecting a portion of the subset of inventory holders, selecting a station of the stations, or selecting a particular inventory holder of the subset of inventory holders based at least in part on previously missed time constraints associated with the particular inventory holder for completing the tasks.

4. The computer-implemented method of claim 1, wherein the route identifies the coordinates for the rest locations for the subset of inventory holders upon completing the set of tasks for the subset of stations.

5. A non-transitory computer-readable storage medium storing computer-executable instructions that, when executed by a computer system, configure the computer system to perform operations, comprising:
   obtaining coordinates for stations of a facility, starting locations of a plurality of inventory holders of the facility, and rest locations of the plurality of inventory holders, the stations configured to receive and transfer inventory items from the plurality of inventory holders according to tasks, an inventory holder of the plurality of inventory holders configured to move, within the facility using an associated propulsion component, according to instructions received from the computer system, the inventory holder comprising one or more containers for storage of the inventory items;
   determining a set of tasks for each station of the stations of the facility based at least in part on inventory item requirements associated with each station, the set of tasks for each station associated with a time constraint;
   determining a priority order for a subset of inventory holders of the plurality of inventory holders based at least in part on priority characteristics associated with each inventory holder of the subset of inventory holders;
   determining, for the subset of inventory holders according to the priority order, tours based at least in part on the set of tasks, the coordinates, and travel attributes for each inventory holder, a tour of the tours identifying an order for each station of the stations to be visited by an inventory holder of the subset of inventory holders for completing a task of the set of tasks within the time constraint for each station;
   modifying, for the subset of inventory holders, the tours by iteratively invoking a large neighborhood search algorithm that uses destroy heuristics; and
   updating previously determined tours for other subsets of inventory holders of the plurality of inventory holders using the modified tours for the subset of inventory holders.

6. The non-transitory computer-readable storage medium of claim 5, wherein the instructions, when executed by the computer system, further configure the computer system to perform operations comprising:
   determining a route for each inventory holder of the subset of inventory holders based at least in part on the modified tours for the subset of inventory holders, the route identifying the coordinates for a subset of stations of the stations corresponding to a modified tour of the modified tours for completing the set of tasks associated with the subset of stations by the time constraint; and transmitting, to the propulsion component of the inventory holder, the instructions for moving the inventory holder from an associated starting location of the starting locations to other areas of the facility according to the route for completing the modified tour.

7. The non-transitory computer-readable storage medium of claim 5, wherein the travel attributes include one or more of a known speed of the inventory holder, a first time period associated with traveling from a first station to a second station of the stations, a second time period associated with transferring the inventory items from the inventory holder, or a queuing delay identified based on a number of other inventory holders of the subset of inventory holders scheduled to be at a corresponding station of the stations.

8. The non-transitory computer-readable storage medium of claim 5, wherein iteratively invoking the large neighborhood search algorithm includes using different destroy heuristics.

9. The non-transitory computer-readable storage medium of claim 5, wherein the time constraint is specified by an administrator associated with the facility.

10. The non-transitory computer-readable storage medium of claim 5, wherein the instructions, when executed by the computer system, further configure the computer system to perform operations comprising obtaining information from each station of the stations that identifies an operational status of each station, wherein determining the set of tasks is further based at least in part on the information.

11. The non-transitory computer-readable storage medium of claim 5, wherein the previously determined tours for the other subsets of inventory holders are determined using a different priority characteristic than the priority characteristics associated with each inventory holder of the subset of inventory holders.

12. The non-transitory computer-readable storage medium of claim 6, wherein the tours for the subset of inventory holders are periodically updated.

13. The non-transitory computer-readable storage medium of claim 6, wherein the tours for the subset of inventory holders are updated based on information from each station of the stations or each inventory holder that identifies an operational status of each station or each inventory holder.

14. An inventory management system for a facility, comprising:

a plurality of inventory holders arranged within starting locations of the facility, an inventory holder of the plurality of inventory holders comprising one or more containers for storage of inventory items, and the inventory holder configured to move, within the facility using an associated propulsion component, according to instructions from an inventory management module;

stations of the facility configured to receive and transfer the inventory items from the plurality of inventory holders according to tasks;

a processor coupled with memory, configured to implement the inventory management module to:

obtain coordinates for the stations and the starting locations of the plurality of inventory holders within the facility;

determine a set of tasks for each station of the stations based at least in part on inventory item requirements associated with each station, the set of tasks for each station associated with a time constraint;

determine a priority order for a subset of inventory holders of the plurality of inventory holders based at least in part on priority characteristics associated with each inventory holder of the subset of inventory holders;

determine, for the subset of inventory holders according to the priority order, tours based at least in part on the set of tasks, the coordinates, and travel attributes for each inventory holder, a tour of the tours identifying an order for each station of the stations to be visited by a corresponding inventory holder of the subset of inventory holders for completing a task of the set of tasks within the time constraint for each station;

modify, for the subset of inventory holders, the tours by iteratively invoking a large neighborhood search algorithm that uses destroy heuristics; and update previously determined tours for other subsets of inventory holders of the plurality of inventory holders using the modified tours for the subset of inventory holders.

15. The inventory management system of claim 14, wherein the inventory management module is further configured to:

determine a route for each inventory holder of the subset of inventory holders based at least in part on the modified tours for the subset of inventory holders, the route identifying the coordinates for a subset of stations of the stations corresponding to a modified tour of the modified tours for completing the set of tasks associated with the subset of stations by the time constraint; and transmit, to the propulsion component of the inventory holder, the instructions for moving the inventory holder from an associated starting location of the starting locations to other areas of the facility according to the route for completing the modified tour.

16. The inventory management system of claim 15, wherein the tours for the subset of inventory holders are updated based at least in part on updated travel attributes received from the subset of inventory holders or the subset of stations.

17. The inventory management system of claim 14, wherein the time constraint is associated with the stations of the facility.

18. The inventory management system of claim 14, wherein the coordinates for the stations and the starting locations correspond to a grid field representation of the facility that includes the stations and the starting locations of the plurality of inventory holders.

19. The inventory management system of claim 18, wherein each grid of the grid field field representation is associated with a travel cost for the inventory holder traversing a corresponding grid.

20. The inventory management system of claim 19, wherein each grid of the grid field field representation is associated with a different travel cost based on attributes of the respective grid.

* * * * *